(12) United States Patent
Ferrari et al.

(10) Patent No.: US 12,479,015 B2
(45) Date of Patent: Nov. 25, 2025

(54) DISSOLVER REACTOR WITH REMOVABLE BASKET

(71) Applicant: POLYLOOP, Genissieux (FR)

(72) Inventors: Romain Ferrari, Lyons (FR); Gabriel Faysse, Genissieux (FR)

(73) Assignee: POLYLOOP (FR)

( * ) Notice: Subject to any disclaimer, the term of this patent is extended or adjusted under 35 U.S.C. 154(b) by 667 days.

(21) Appl. No.: 17/909,882

(22) PCT Filed: Mar. 10, 2021

(86) PCT No.: PCT/FR2021/050405
§ 371 (c)(1),
(2) Date: Sep. 7, 2022

(87) PCT Pub. No.: WO2021/181043
PCT Pub. Date: Sep. 16, 2021

(65) Prior Publication Data
US 2023/0100621 A1   Mar. 30, 2023

(30) Foreign Application Priority Data
Mar. 11, 2020   (FR) ........................................ 2002399

(51) Int. Cl.
*B09B 3/38*  (2022.01)
*B01J 8/10*  (2006.01)
(Continued)

(52) U.S. Cl.
CPC ..................... *B09B 3/38* (2022.01); *B01J 8/10* (2013.01); *B01J 19/006* (2013.01);
(Continued)

(58) Field of Classification Search
CPC ... B09B 3/38; B09B 2101/85; B09B 2101/95; B01J 19/0066; B01J 19/1812;
(Continued)

(56) References Cited

U.S. PATENT DOCUMENTS 3,233,836 A    2/1966  Merges
2012/0065280 A1  3/2012  Vainer et al.

FOREIGN PATENT DOCUMENTS

EP    2276801 A    1/2011
WO    0228610 A1   4/2002
(Continued)

OTHER PUBLICATIONS

International Search Report and Written Opinion from corresponding PCT/FR2021/050405, dated Jun. 24, 2021, 11 pages.

*Primary Examiner* — Rabon A Sergent
(74) *Attorney, Agent, or Firm* — Dilworth IP, LLC

(57) ABSTRACT

A horizontal reactor equipped with a front cover and including a circular cylindrical rotating cage having multiple openings and rotated about a horizontal axis by a motor, a single horizontal rotary shaft mechanically connecting the rotating cage to the motor and extending towards the outside from the distal face of the housing, at least one bearing provided around the rotary shaft to hold it and guide it, and to support the weight of the rotating cage in cantilever, at least one removable basket having multiple openings and intended to be able to be introduced inside the rotating cage and to be removed through an open circular face of the rotating cage provided opposite the cover.

15 Claims, 5 Drawing Sheets

(51) Int. Cl.
  *B01J 19/00* (2006.01)
  *B01J 19/18* (2006.01)
  *B01J 19/28* (2006.01)
  *B09B 101/85* (2022.01)
  *B09B 101/95* (2022.01)
  *B29B 17/02* (2006.01)
  *C08J 11/08* (2006.01)

(52) U.S. Cl.
  CPC ....... *B01J 19/0066* (2013.01); *B01J 19/1812* (2013.01); *B01J 19/28* (2013.01); *B29B 17/02* (2013.01); *C08J 11/08* (2013.01); *B01J 2208/00212* (2013.01); *B01J 2219/00094* (2013.01); *B01J 2219/00768* (2013.01); *B01J 2219/182* (2013.01); *B01J 2219/1943* (2013.01); *B09B 2101/85* (2022.01); *B09B 2101/95* (2022.01); *B29B 2017/0293* (2013.01); *Y02W 30/62* (2015.05)

(58) Field of Classification Search
  CPC .......... B01J 2219/182; B01J 2219/1943; B01J 2208/00212; B01J 2219/00094; B01J 2219/00768; B01J 19/006; B01J 19/28; B01J 8/10; B29B 2017/0293; B29B 17/02; Y02W 30/62; C08J 11/08
  See application file for complete search history.

(56) References Cited

FOREIGN PATENT DOCUMENTS

| | | | | |
|---|---|---|---|---|
| WO | WO-2004089547 A1 | * | 10/2004 | .............. B01J 19/28 |
| WO | WO-2006041439 A1 | * | 4/2006 | .............. F16J 13/20 |
| WO | 2009135891 A1 | | 11/2009 | |

* cited by examiner

DISSOLVER REACTOR WITH REMOVABLE BASKET

FIELD OF THE INVENTION

The present invention relates to the technical field of chemical reactors used for recycling polymer-based articles and comprising textiles or fibers.

The invention relates more specifically to the field of chemical reactors used for dissolving the polymer of articles comprising textile or fibers coated or impregnated with a polymer, by means of a solvent in order to be able, on the one hand, to recover the textile or the fibers, but also, and above all, to be able, on the other hand, to recover the polymer after reprocessing the polymer dissolved in the solvent, for its subsequent reuse.

BACKGROUND OF THE INVENTION

Patent EP 2276801 B1 discloses a process for recycling an article made of polyvinyl chloride (PVC) by selectively dissolving said shredded article in a substantially anhydrous solvent and by precipitating the polymer by injection of water steam until obtaining a mixture essentially consisting of water and solid particles of polymer.

The selective dissolution process before precipitation is usually implemented in a vertical reactor equipped with a central vertical stirrer and a filter grid in the lower part of the reactor.

However, this type of reactor, used until now to implement processes similar to that of patent EP 2276801 B1, has many drawbacks.

First of all, the introduction of the shredded articles inside the reactor is done through an opening located on the top of the reactor, the dimensions of which are reduced to address sealing problems, and this introduction is time-consuming, difficult and tedious, taking an hour or more. This results in a significant loss of time and reactor downtime which are economically unprofitable.

Afterwards, the liquids are evacuated from the lower part of the reactor through a filter grid having a small surface area limited to the section of the reactor, operation which is inefficient and time-consuming, in particular, when the recycled articles contain fibers or textile that retain liquids. It follows that these fibers or textiles retain a large proportion of solution after dissolution, requiring a long and less efficient rinsing operation. It also follows that these fibers or textiles retain a large proportion of solvent after rinsing, thereby requiring a stripping operation (to evacuate the solvent residues), which is also time-consuming and tedious and a waste of energy. Finally, after the recycling process, the removal of these fibers or textiles from the reactor must be done by resuspension in water then evacuation by flushing with water through an opening whose dimensions are reduced to address sealing problems and this removal is time-consuming, difficult and tedious, particularly if the fibers or textiles have agglomerated.

In addition, the fibers or textiles come out wet from the reactor, with an increased apparent weight due to the retention of liquid, and require subsequent stages of draining, spinning and drying before treatment for disposal or recovery.

Lastly, when the recycled articles comprise fibers or textiles, said fibers or textiles tend to wrap around the agitator during the rotation of the latter. It is then necessary to manually remove said fibers or textiles, which is both difficult and very time-consuming. This type of problem is of such importance that processes similar to that of patent EP 2276801 currently tend to no longer be used to recycle articles comprising fibers or textiles.

SUMMARY OF THE INVENTION

Therefore, the object of the present invention is to provide a solution to the problems encountered when using chemical reactors for the recycling of articles based on polymer and textiles or fibers.

The objects of the present invention are achieved using a horizontal reactor comprising a fixed outer housing of generally circular cylindrical shape, equipped with at least one liquid inlet and at least one liquid outlet, with a cylindrical wall bordered by a front face and distal face opposite to each other. This reactor is characterized in that the casing has an opening formed in its front face, this opening being equipped with a cover which can be closed in a sealed manner.

Additionally, the reactor further comprises:
  a rotating cage of generally circular cylindrical shape, comprising multiple openings, housed in the housing and rotatably mounted around a substantially horizontal axis extending along the longitudinal axis of the housing,
  a motor to drive the rotating cage,
  a single horizontal rotary shaft, mechanically connecting the rotating cage to the motor and extending outwards from the distal face of the housing,
  at least one bearing provided around the rotary shaft to hold it and guide it, and to support the weight of the rotating cage in cantilever,
  at least one removable basket comprising multiple openings and intended to be able to be introduced, and preferably fixed, inside the rotating cage and to be removed therefrom through an open circular face of the rotating cage provided opposite the opening equipped with a cover.

Due to the use of a pull-out basket for loading the articles to be dissolved, the loading of the articles to be dissolved and the unloading of the insoluble solids is advantageously easy, reliable and fast. The draining and spinning of the solids impregnated with liquid can advantageously be carried out inside the reactor, which makes the solvent rinsing operations and subsequent stripping operations more effective in order to remove the rinsing solvent and limits the presence of water or other liquids in these solids after removal from the reactor. The rotational drive of the rotating cage and of the removable basket allows for efficient centrifugal spin-drying.

The use of a removable basket, driven in rotation inside the rotating cage, advantageously makes it possible to dissolve the polymer-based articles in an efficient manner, without the risk of fibers or textiles wrapping around any agitator or other rotating part within the articles to be dissolved.

The multiple openings of the rotating cage and the basket make it possible to bathe the articles to be dissolved in the solvent, to rinse the solid matters and to drain and spin them in a very efficient manner, with a slower clogging than with the filter grid of previous reactors.

The effective filtration area of this reactor is about 10 times greater than that of the vertical reactor of the same volume. Indeed, by way of example, for a reactor with a capacity of 1.570 $m^3$, i.e., a cylinder 2 m high and 1 m in diameter, the lower filter has a maximum surface area of 0.78 m² while the removable basket represents an area of 7.85 m².

The rotation of the rotating cage and the basket may be modulated and reversed for better agitation and for better dissolution of polymer-based articles.

The increased efficiency of the reactor for dissolving polymer-based articles advantageously makes it possible to reduce both the quantity of solvent used and the time of use of the reactor, which, in particular, provides an economic and ecological advantage.

Its design also allows for faster, more efficient and more economical rinsing of solids, for example after dissolution of the polymer.

According to an exemplary embodiment, the reactor comprises at least one immobilization device intended to secure the at least one removable basket inside the rotating cage. This device allows, in particular, the removable baskets housed inside the rotating cage not to cause vibrations within the reactor when they are rotated with the rotating cage.

According to another exemplary embodiment, the reactor comprises at least one guiding device intended to guide and center the rotating cage inside the housing. This device makes it possible, in particular, to reduce the vibrations within the reactor when the rotating cage is rotated.

According to another exemplary embodiment, the reactor comprises at least one sealing bearing provided on the rotary shaft at the distal face of the housing so as to ensure seal between the housing and the rotary shaft.

According to an additional exemplary embodiment, the removable basket comprises stirring blades distributed over its internal face. These stirring blades improve the stirring inside the removable basket and, therefore, improve the dissolution of polymer-based articles.

According to another exemplary embodiment, the internal diameter of the opening of the housing equipped with a cover is greater than or equal to the internal diameter of the rotating cage. Thus, the cover preferably allows a full-width opening for full access to the open face of the rotating cage. Due to the support of the rotating cage in cantilever, access to the open face of the rotating cage is completely free and allows the operator to have room to circulate at the front face of the housing and to carry out the maneuvers for introducing/removing a removable basket inside/outside the rotating cage.

According to another exemplary embodiment, at least one removable basket is generally cylindrical in shape. This shape makes it possible, in particular, to offer a large surface for the deposit of the articles to be dissolved, and for the draining and spinning of the solid matter. It also makes it possible to use the maximum volume available inside the reactor.

According to an additional exemplary embodiment, the housing is sealed when the cover is closed. This prevents any leakage of liquid or steams from escaping outside the reactor.

According to another exemplary embodiment, the removable basket comprises a removable protective layer permeable to liquids on its internal face. This layer allows, in particular, to protect the inside of the removable basket when the articles to be dissolved are particularly aggressive or abrasive.

According to another exemplary embodiment, the removable protective layer is a grid or a net, which makes it possible to effectively and inexpensively protect the inside of the removable basket, while allowing liquids to go through.

According to an exemplary embodiment, the removable basket comprises at least one access hatch. This at least one access hatch advantageously allows the introduction of the articles to be dissolved and of the removable protective layer inside the removable basket, as well as their removal.

According to another exemplary embodiment, the reactor comprises an automated device comprising actuators provided for introducing the removable basket inside the rotating cage and removing it therefrom. This advantageously facilitates the work of the operator and reduces the duration of operations and the risk of accidents when handling the removable baskets at the reactor.

According to an additional exemplary embodiment, the reactor comprises a device for guiding the removable basket in translation inside the rotating cage. This device advantageously facilitates the introduction of the removable baskets inside the rotating cage and its removal therefrom. Advantageously, the translation guiding device may also be provided to ensure the positioning and maintenance of the removable baskets inside the rotating cage.

According to an exemplary embodiment, the rotary shaft comprises a through pipe having a supply end intended to be connected to a steam or liquid supply, and an outlet end which opens inside at least one removable basket. The entry of steam or a liquid, for example a treatment product for stripping, into the removable baskets directly through the horizontal rotary shaft improves the stripping of the fibers after rinsing.

The objects of the present invention are also achieved using a process for recycling articles based on polymer and textile or fibers by means of a reactor according to the invention.

BRIEF DESCRIPTION OF THE DRAWINGS

Other characteristics and advantages of the present invention will appear more clearly on reading the following description, made with reference to the appended drawings, given by way of non-limiting examples, in which.

DETAILED DESCRIPTION OF THE INVENTION

Figure 1:
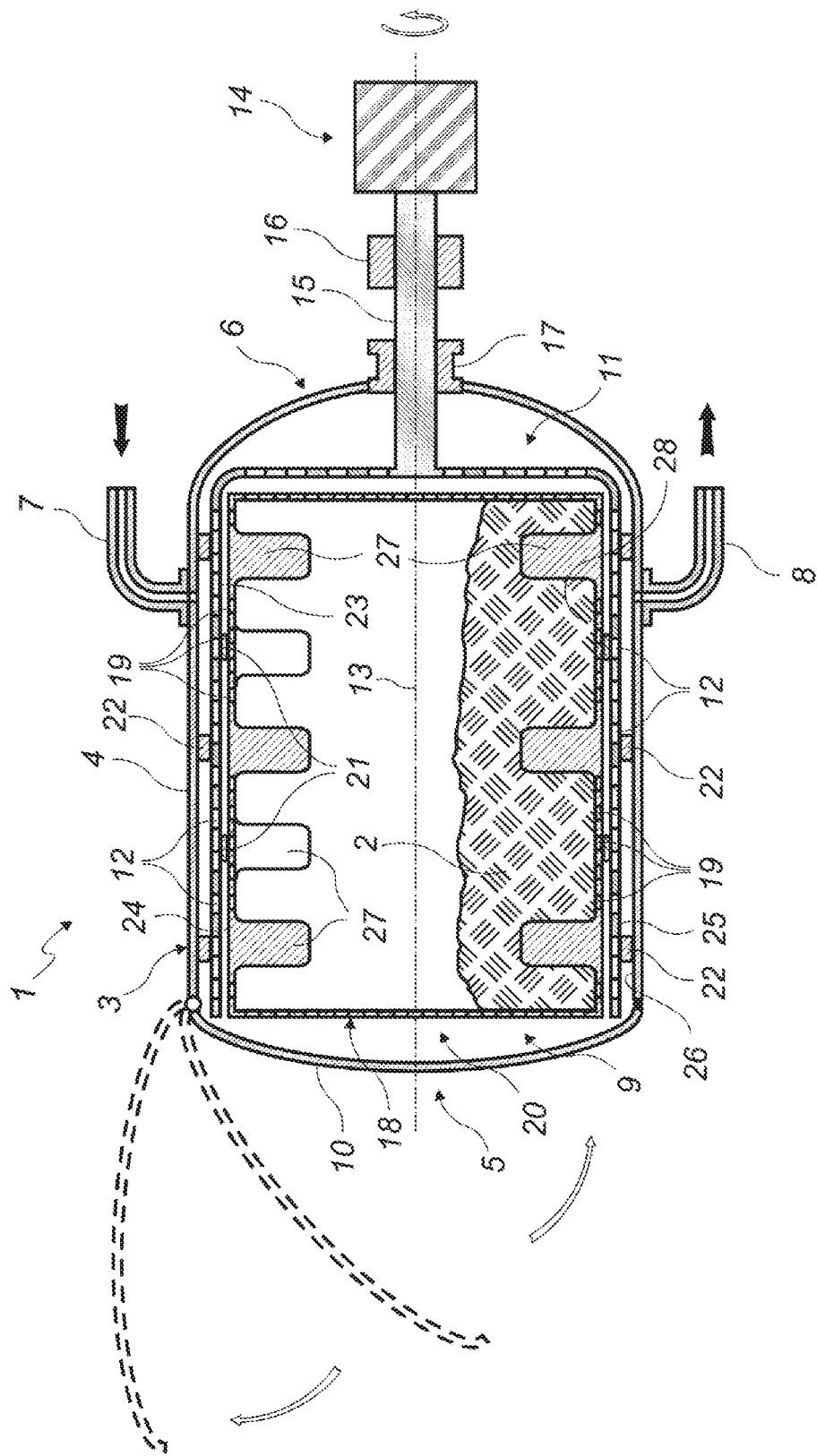
FIG. 1 is a schematic sectional view of a reactor according to the invention, in which a removable basket loaded with items to be recycled is housed in the rotating cage.

Structurally and functionally identical elements shown in several separate figures assigned the same numerical or alphanumeric reference.

The reactor (1) according to the invention is preferably a chemical reactor (1) used for the recycling of articles (2) based on polymer and textile or fibers, in which these articles (2) are subjected to a dissolution of the polymer by means of a solvent in order to be able, on the one hand, to recover the textile or the fibers, but also, and above all, to be able, on the other hand, to recover the polymer after reprocessing the polymer dissolved in the solvent. When implementing this process, the solvent can be regenerated during dissolution if the polymer has not been completely dissolved. After dissolution of the polymer, the solid residues, namely the textile or the fibers, are generally rinsed with a hot solvent and then with hot water.

In general, the reactor according to the invention may be used for the implementation of any process for treating or dissolving solid materials, or even for any process for dissolving a solid material in a solvent.

The reactor (1) according to the invention is a horizontal reactor, which distinguishes it from the conventional vertical reactors conventionally used in the chemical industry.

By the term "horizontal" we want here to differentiate the reactor (1) of the invention from conventional vertical reactors. In fact, the reactor (1) according to the invention may have a slight inclination, for example from 0° to 10° with respect to the horizontal. An inclination complicates the loading and unloading of the basket, but can allow better bottom emptying.

The reactor (1) comprises a fixed housing (3) of generally circular cylindrical shape, with a cylindrical wall (4) bordered by a front face (5) through which the articles (2) to be recycled are introduced into the reactor (1), and a distal face (6) where the motors of the reactor (0 are located in particular, these two faces (5, 6) being opposite to each other.

The housing (3) comprises at least one liquid inlet (7), in particular for supplying the reactor (1) with solvent and rinsing water, and a liquid outlet (8) for evacuating the dissolved polymer, the solvent not used and liquids resulting from rinsing.

The reactor (1) comprises an opening (9) provided in its front face (5) for introducing the articles (2) to be treated, this opening (9) being equipped with a cover (10) which can be closed in a sealed manner.

The housing (3) is sealed when the cover (10) is closed. By sealed, it is meant that it does not allow any liquid or gas to pass outside the reactor, except through the orifices provided for this purpose, in particular, the at least one liquid inlet (7) and the at least one liquid outlet (8), under the normal conditions of pressure and temperature of use of the reactor (1).

The reactor (1) is unique in that it further comprises a rotating cage (11) of generally circular cylindrical shape, comprising multiple openings (12). This rotating cage (11) is housed in the housing (3) and rotatably mounted around a substantially horizontal axis extending along the longitudinal axis (13) of the housing (3).

The front circular face (20) of the rotating cage (11), i.e., the face of the rotating cage (11) which is provided facing the front face (5) of the housing (3), has an opening and is preferably completely open.

The distal circular face (21) of the rotating cage (11), opposite the front circular face (20), is preferably closed by a wall having multiple openings (12).

The rotating cage (11) is rotated by a motor (14) by means of a horizontal rotary shaft (5) mechanically connecting the rotating cage (11) to the motor (14) and extending outwards from the distal face (6) of the housing (3).

The reactor (1) has a single horizontal rotary shaft (15), unlike some containers that can be rotatably mounted at two coaxial shafts provided on either side of said containers.

In order to support the weight of the rotating cage (11) in cantilever, the reactor (1) also comprises at least one bearing (16) provided around the rotary shaft (15) to hold it and guide it. The reactor (1) may also comprise at least one sealing bearing (17) provided on the rotary shaft (15) at the distal face (6) of the housing (3) so as to ensure sealing between the housing (3) and the rotary shaft (15).

The reactor (1) is also unique in that it further comprises at least one removable basket (18) comprising multiple openings (19) and intended to be able to be introduced inside the rotating cage (11) and to be removed from it through the open circular face (20) of the rotating cage (11). The removable baskets (18) are preferably generally cylindrical in shape. They may have a circular, star-shaped, ovoid or crenellated section. The removable baskets 8) may also be slightly tapered.

Figure 6:
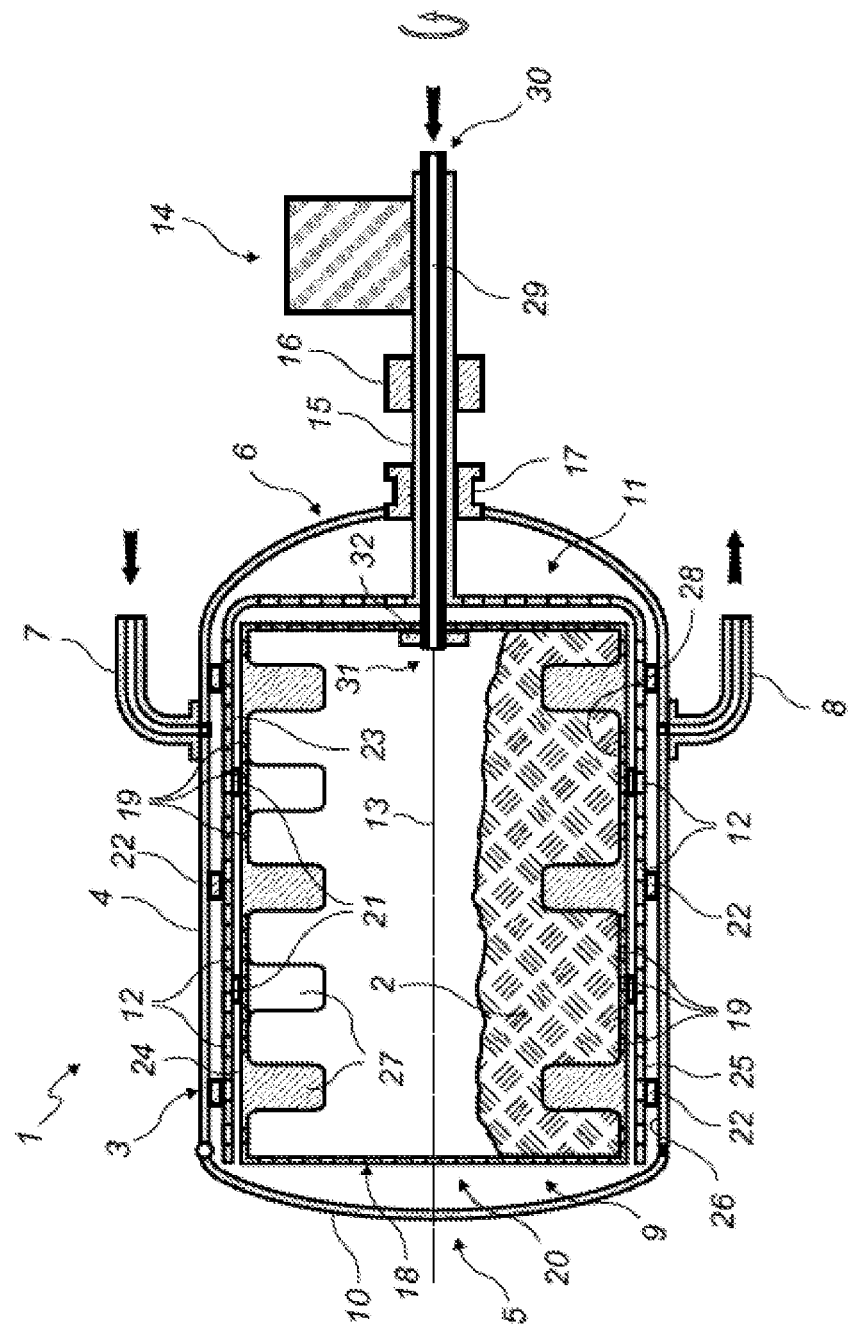
FIG. 6 is a schematic sectional view of a reactor according to the invention, in which the rotary shaft incorporates a through pipe.

According to one embodiment of the invention, the rotary shaft is pierced to allow steam or a liquid to be introduced directly into the basket. Thus, as illustrated in FIG. 6, the rotary shaft (15) is hollow and incorporates a through pipe (29) to allow the introduction of steam or a liquid directly into the removable baskets (18), which improves, in particular, the efficiency of the stripping operations. For this purpose, one supply end (30) of the through pipe (29) is designed to be connected to a steam or liquid supply, while the other end of the through pipe (29), designated as outlet end (31), opens inside the reactor (1), preferably inside at least one removable basket (18). The removable baskets (18) may then have a connection (32), not necessarily sealed, with the through pipe (29) or a simple through-hole for the through pipe (29) in order to allow the introduction of steam or liquids directly inside said removable baskets (18).

The removable baskets (8) may also have nozzles (not shown) to optimize the circulation of liquids and mixing.

Figure 2:
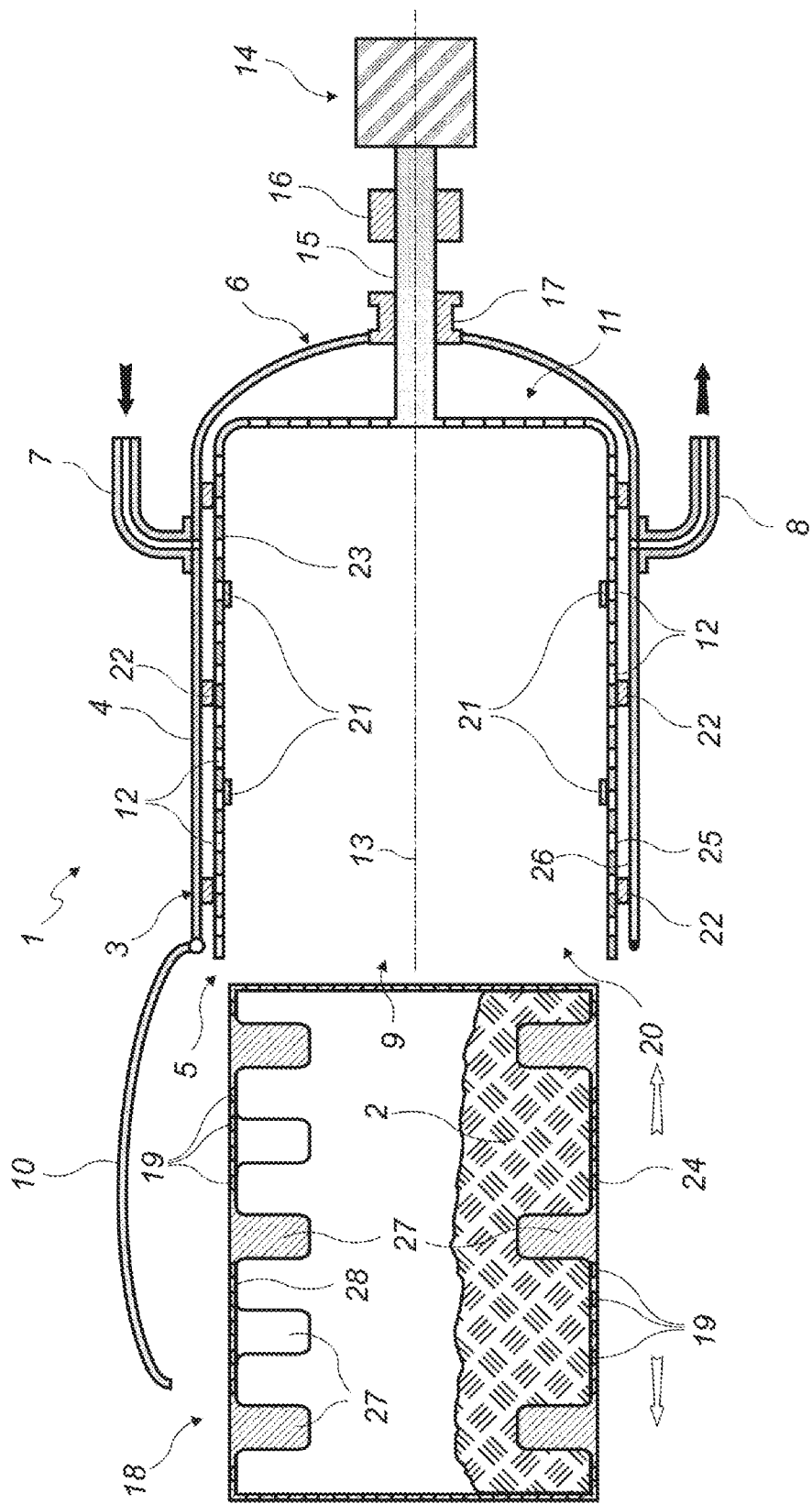
FIG. 2 is a schematic sectional view of a reactor according to the invention, in which a removable basket is being introduced into or removed from the rotating cage.
Figure 3:
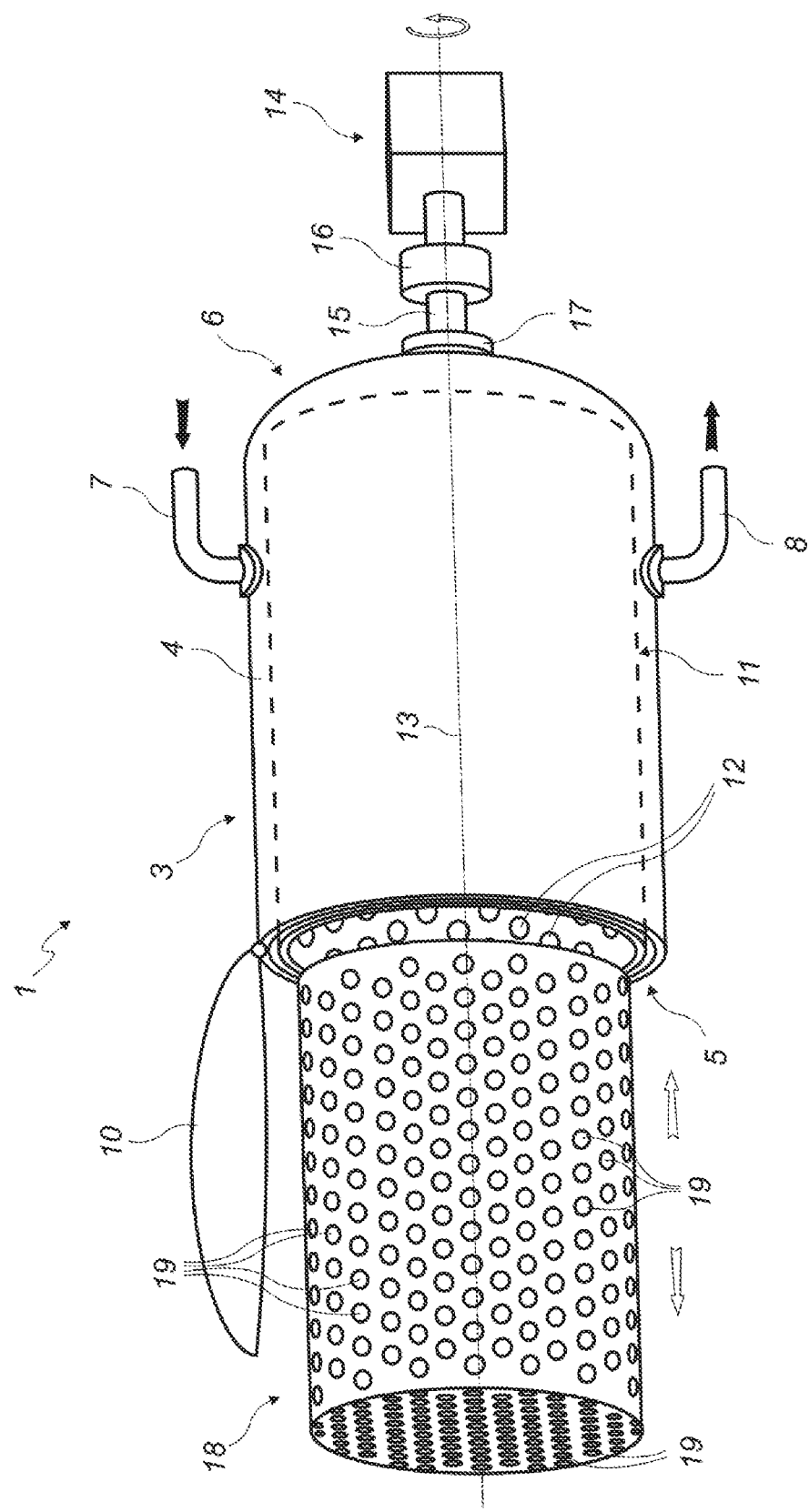
FIG. 3 is a schematic perspective view of the reactor shown in FIG. 2.
Figure 4:
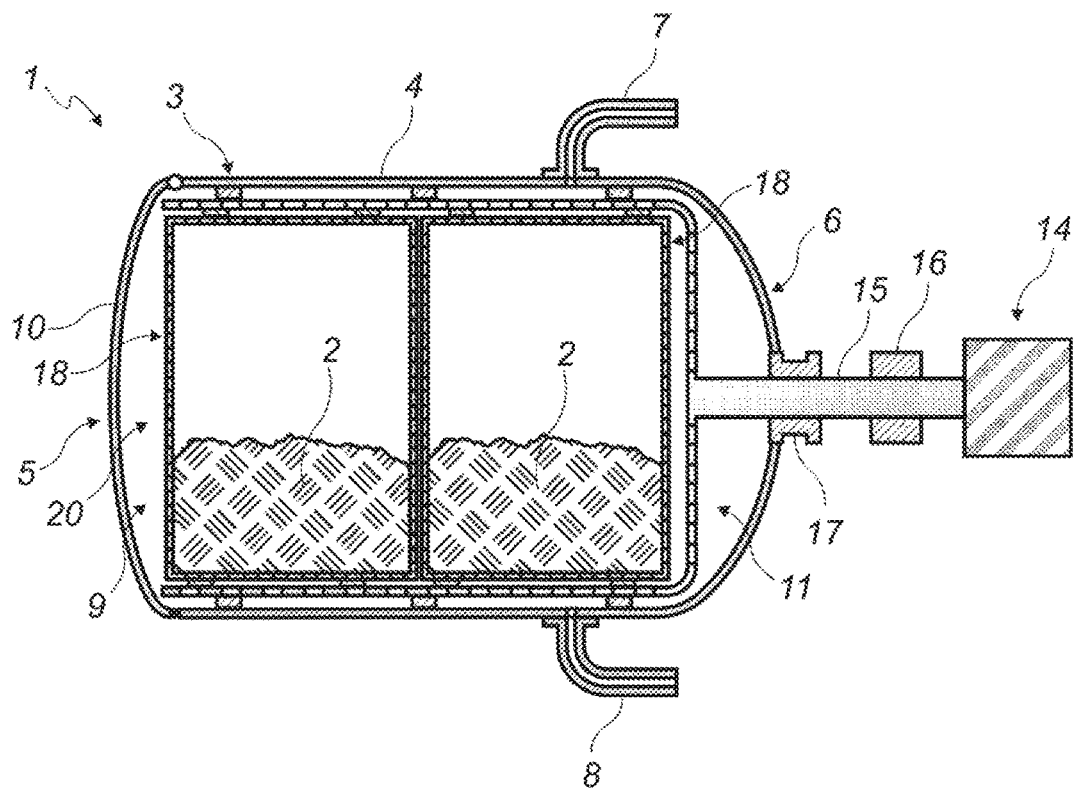
FIG. 4 is a schematic sectional view of a reactor according to the invention, in which two removable baskets loaded with items to be recycled are housed one above the other in the rotating cage.
Figure 5:
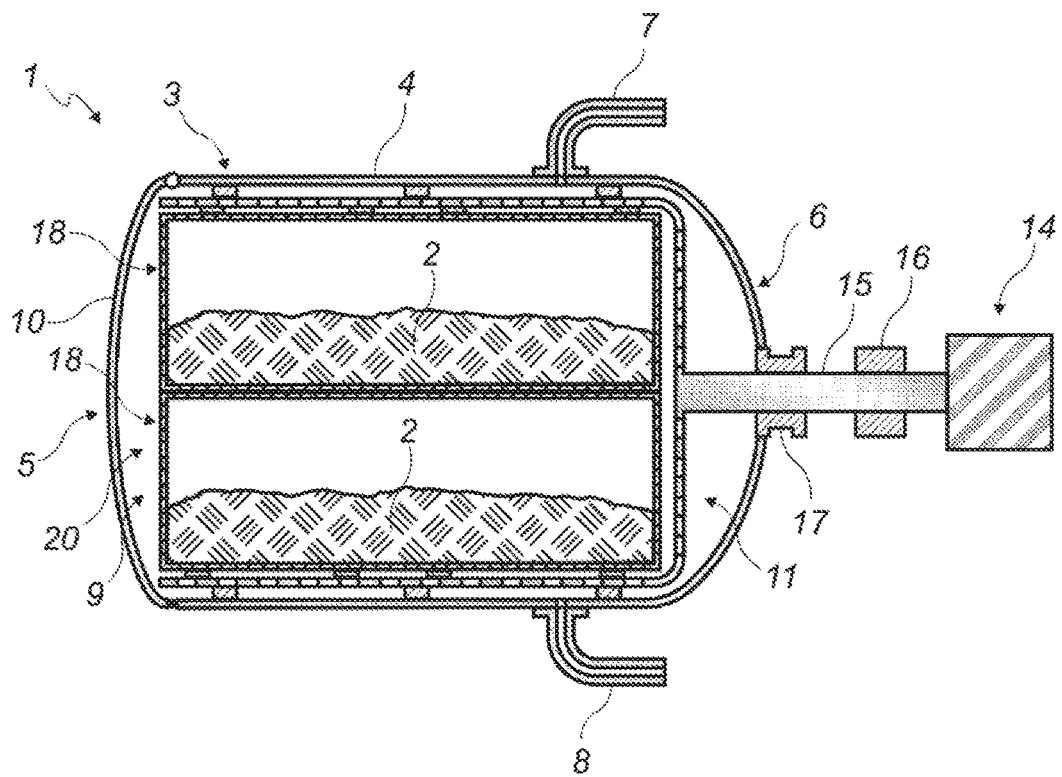
FIG. 5 is a schematic sectional view of a reactor according to the invention, in which two removable baskets loaded with items to be recycled are housed one behind the other in the rotating cage.

The reactor (1) may comprise a single removable basket (18), as shown in FIGS. 1 to 3, or several removable baskets (18), as shown in FIGS. 4 and 5. In the case of multiple removable baskets (18), the latter may be housed one above the other (see FIG. 4) and/or one behind the other (see FIG. 5) in the rotating cage (11). In the case where the removable baskets (18) are housed one above the other, they may be semi-cylindrical in shape.

The solid articles (2) to be treated are introduced into the removable baskets (18). For this purpose, the removable baskets (18) comprise at least one access hatch (not shown) or any other similar device. Thus, for example, part of the removable baskets (18) may be dismountable or removable in order to allow access to the interior of the removable baskets (18). Once the articles (2) have been treated, it is by this means of access that the solid residues may be removed outside the removable baskets (18), In the case of recycling articles (2) based on polymer and textile or fibers, the mass of textile or fibers which results from the treatment with the solvent remains trapped in the removable baskets (18).

Indeed, the dimensions of the multiple openings (19) of the removable baskets (18) are provided so that the solid residues left in the removable baskets (18) cannot pass through these openings.

It should also be noted that the multiple openings (12) of the rotating cage (11) may be larger than the multiple openings (19) of the removable baskets (18).

The purpose of these multiple openings (12, 19) is, obviously, to allow liquids to pass from the housing (3) into the interior of the removable baskets (18) and vice versa.

They allow, in particular, the free circulation of the solvent, of the dissolved polymer and of the rinsing products, while preventing the solid articles (2), and the mass of textile or fibers from spilling outside the removable baskets (18).

In particular in the case where the articles (2) to be treated are particularly aggressive or abrasive and are likely to deteriorate the internal cylindrical face (28) of the removable baskets (18), a removable protective layer (not shown), permeable to liquids, may be provided against said internal cylindrical face (28) of the removable baskets (18). This protective layer may, for example, be in the form of a grid or a net.

The rotational drive of the rotating cage (11) by the motor (14) also drives the removable baskets (18) in rotation, which improves mixing inside the removable baskets (18). In order to improve this mixing, the direction of rotation may be reversed during the treatment of the articles (2).

The rotational speed may be adjusted in order to optimize the process implemented with the reactor (1). This rotational speed may be considerably increased, in particular at the end of the article treatment cycle (2), in order to perform a centrifugal spin-drying of the solid products which remain inside the removable baskets (18).

The reactor (1) preferably comprises at least one immobilization device (21) intended to secure the at least one removable basket (18) inside the rotating cage (11). This immobilization device (21) may, for example, comprise magnets, mechanical fastening means or a system of rails and slides, so that the at least one removable basket (18) housed inside the rotating cage (11) does not cause vibrations within the reactor (1) when it is rotated with the rotating cage (11). This immobilization device (21) may be provided on the internal cylindrical face (23) of the rotating cage (11), on the external cylindrical face (24) of the removable baskets (18), or on these two faces (23, 24).

The reactor (1) preferably comprises at least one guiding device (22) intended to guide and center the rotating cage (11) inside the housing (3). This guiding device (22) may, for example, comprise rotary guide bearings and makes it possible, in particular, to reduce the vibrations within the reactor (1) when the rotating cage (11) is rotated. This guiding device (22) may be provided on the external cylindrical face (25) of the rotating cage (11), on the internal cylindrical face (26) of the housing (3), or on these two faces (25, 26).

According to a preferred embodiment of the invention, the removable basket (18) comprises stirring blades (27) distributed over its internal face (28) to improve stirring and mixing inside the removable basket (18).

The internal diameter of the opening (9) of the housing (3) equipped with a cover (10) is preferably greater than or equal to the internal diameter of the rotating cage (11) in order to allow total access to the open face (20) of the rotating cage (11).

According to a preferred embodiment of the invention, not shown in the figures, the reactor (1) nay comprise an automated device comprising actuators provided for introducing the removable basket (18) inside the rotating cage (11) and remove it therefrom. This automated device, which is obvious to a person skilled in the art from the field of robotics and automation, is not described here.

According to another preferred embodiment of the invention, not shown in the figures, the reactor (1) may also comprise a device for guiding the removable basket (18) in translation inside the rotating cage (11), comprising, for example, a system with rails and slides, to facilitate the introduction of the removable baskets (18) inside the rotating cage (11) and their removal therefrom.

The device for guiding the removable basket (18) in translation inside the rotating cage (11) and the guiding device (22) intended to guide and center the rotating cage (11) inside the housing (3) may include parts common to both devices, or even be in the form of a single device.

The invention also relates to a method for recycling articles (2) based on polymer and textile or fibers by means of the reactor (1) of the invention. It relates to processes similar to that of patent EP 2276801 131 using the reactor (1) of the invention, but also any other process for treating, dissolving or solubilizing a solid material in a solvent using the reactor (1) of the invention.

The use of solvents inside the reactor (1) of the invention implies perfect sealing of the reactor to gases and liquids while the latter is subjected to variable pressure and temperature conditions.

According to another exemplary embodiment, not shown in the figures, the reactor comprises at least one external device intended to help the operator introduce the removable basket (18) inside the rotating cage (11). This external device may, in particular, comprise slides or a ramp on which the removable basket (18) can slide to penetrate inside the rotating cage (11). This external device may also comprise any suspension device, for example a gantry, making it possible to lift and move the removable basket (18) outside the reactor (1) of the invention.

The invention claimed is:

1. A horizontal reactor comprising a fixed outer housing of generally circular cylindrical shape, equipped with at least one liquid inlet and at least one liquid outlet, with a cylindrical wall bordered by a front face and a distal face opposite to each other, characterized in that the housing has an opening provided in its front face, the opening being equipped with a cover which can be closed in a sealed manner, and in that the reactor further comprises a rotating cage of generally circular cylindrical shape, comprising multiple openings, housed in the housing and rotatably mounted around a substantially horizontal axis extending along a longitudinal axis of the housing, a motor for driving the rotating cage in rotation, a single horizontal rotary shaft mechanically connecting the rotating cage to the motor and extending outwards from the distal face of the housing, at least one bearing provided around the rotary shaft to hold and guide the rotary shaft, and to support a weight of the rotating cage in cantilever, at least one removable basket comprising multiple openings and configured to be able to be introduced inside the rotating cage and to be removed therefrom through an open circular face of the rotating cage provided opposite the opening equipped with the cover.

2. The reactor according to claim 1, characterized in that the reactor comprises at least one immobilization device configured to secure the at least one removable basket inside the rotating cage.

3. The reactor according to claim 1, characterized in that the reactor comprises at least one guiding device configured to guide and center the rotating cage inside the housing.

4. The reactor according to claim 1, characterized in that the reactor comprises at least one sealing bearing provided on the rotary shaft at the distal face of the housing so as to seal between the housing and the rotary shaft.

5. The reactor according to claim 1, characterized in that the removable basket comprises stirring blades distributed over its internal face.

6. The reactor according to claim 1, characterized in that an internal diameter of the opening of the housing equipped with the cover is greater than or equal to the internal diameter of the rotating cage.

7. The reactor according to claim 1, characterized in that the at least one removable basket is generally cylindrical in shape.

8. The reactor according to claim 1, characterized in that the housing is sealed when the cover is closed.

9. The reactor according to claim 1, characterized in that the removable basket comprises a removable protective layer permeable to liquids on its internal face.

10. The reactor according to claim 9, characterized in that the removable protective layer is a grid or a net.

11. The reactor according to claim 1, characterized in that the removable basket comprises at least one access hatch.

12. The reactor according to claim 1, further comprising an automated device comprising actuators provided for introducing the removable basket inside the rotating cage and for removing it therefrom.

13. The reactor according to claim 1, further comprising a guiding device in translation of the removable basket inside the rotating cage.

14. The reactor according to claim 1, characterized in that the rotary shaft comprises a through pipe having a supply end configured to be connected to a steam or liquid supply and an outlet end which opens inside the at least one removable basket.

15. A process for recycling articles comprising a textile or fibers coated or impregnated with a polymer, wherein the articles are subjected to a dissolution of the polymer by means of a solvent in a reactor according to claim 1.

* * * * *